(12) United States Patent
Spencer et al.

US009909003B2

(10) Patent No.: US 9,909,003 B2
(45) Date of Patent: Mar. 6, 2018

(54) FIRE-RETARDANT COMPOSITE MATERIALS

(71) Applicant: Gurit (UK) Ltd, Newport, Isle of Wight, Hampshire (GB)

(72) Inventors: Paul John Spencer, Southampton (GB); Benjamin Edward Creaser, Ryde (GB)

(73) Assignee: Gurit (UK) Ltd., Newport, Isle of Wight (GB)

( * ) Notice: Subject to any disclaimer, the term of this patent is extended or adjusted under 35 U.S.C. 154(b) by 0 days.

(21) Appl. No.: 15/133,565

(22) Filed: Apr. 20, 2016

(65) Prior Publication Data

US 2016/0230001 A1    Aug. 11, 2016

Related U.S. Application Data

(63) Continuation of application No. 13/388,635, filed as application No. PCT/EP2010/061383 on Aug. 5, 2010, now abandoned.

(30) Foreign Application Priority Data

Aug. 5, 2009   (GB) .................................. 0913683.9

(51) Int. Cl.
| | |
|---|---|
| C08L 63/00 | (2006.01) |
| C09J 163/00 | (2006.01) |
| C08G 59/14 | (2006.01) |
| C08G 59/40 | (2006.01) |
| C08G 59/68 | (2006.01) |
| C08J 5/24 | (2006.01) |
| C08L 21/00 | (2006.01) |
| C08L 71/02 | (2006.01) |

(52) U.S. Cl.
CPC .......... *C08L 63/00* (2013.01); *C08G 59/1488* (2013.01); *C08G 59/4021* (2013.01); *C08G 59/686* (2013.01); *C08J 5/24* (2013.01); *C09J 163/00* (2013.01); *C08J 2363/00* (2013.01); C08L 21/00 (2013.01); C08L 71/02 (2013.01); Y10T 428/24149 (2015.01); Y10T 428/24994 (2015.04)

(58) Field of Classification Search
CPC ........ C09J 163/00; C08J 2363/00; C08J 5/24; C08G 59/1488; C08G 59/488; C08G 59/4021; C08L 21/00; C08L 63/00; Y10T 428/24994
USPC .............................. 428/297.4, 116, 339, 413
See application file for complete search history.

(56) References Cited

U.S. PATENT DOCUMENTS

| | | |
|---|---|---|
| 4,695,598 A | 9/1987 | Yamamoto et al. |
| 5,037,689 A | 8/1991 | Boyd |
| 5,453,453 A * | 9/1995 | Lamon ........................ C08J 9/10 521/124 |
| 6,025,438 A | 2/2000 | Hinterwaldner et al. |
| 6,291,626 B1 | 9/2001 | Wang et al. |
| 6,645,631 B2 | 11/2003 | Gan et al. |
| 7,635,728 B2 | 12/2009 | Diakoumakos et al. |
| 2002/0119317 A1 | 8/2002 | Gan et al. |
| 2004/0247881 A1 | 12/2004 | Dean et al. |
| 2008/0315164 A1 | 12/2008 | Wei |
| 2011/0144244 A1 | 6/2011 | Lee |
| 2011/0319564 A1 | 12/2011 | Corley et al. |

FOREIGN PATENT DOCUMENTS

| | | |
|---|---|---|
| CN | 1423678 | 6/2003 |
| CN | 1833001 A | 9/2006 |
| DE | 102005042097 A1 | 3/2007 |
| EP | 1249336 A2 | 1/2002 |
| EP | 1312638 A1 | 5/2003 |
| EP | 1359174 A1 | 11/2003 |
| EP | 1731553 A1 | 12/2006 |
| JP | 2004059704 A | 7/2002 |
| JP | 2007326929 A | 6/2006 |
| WO | 2007063580 A1 | 11/2005 |
| WO | 20080123474 A1 | 3/2007 |
| WO | 20080136096 A1 | 4/2007 |

OTHER PUBLICATIONS

Office Action dated 203-09-24 in corresponding Chinese application CN20108004458.7.
Nov. 26, 2009 GB Search and Examination Report in corresponding application GB0913683.9.
Oct. 14, 2010 Int'l. Search Report and Written Opinion in corresponding application PCT/EP2010/061383.
Database WPI Week 200919, Thomson Scientific, London, GB; AN 2009-B48291, XP002603261 & CN 101 280 093 A (Guangdong Shengyi SCI Oct. 8, 2008, Abstract.

* cited by examiner

*Primary Examiner* — Camie S Thompson
(74) *Attorney, Agent, or Firm* — Polsinelli PC

(57) ABSTRACT

A prepreg for the manufacture of a fiber-reinforced composite material, the prepreg including:
 i. an epoxy-resin matrix including:
  a. at least one non-halogenated epoxide-containing resin which has been chemically modified with at least one of a nitrogen- and/or phosphorous-containing molecule which has been chemically reacted with the epoxide-containing molecule;
  b. at least one toughening additive comprising an elastomeric or thermoplastic material chemically reacted with the at least one epoxide-containing resin;
  c. at least one mineral filler to provide fire-retardancy; and
  d. at least one catalyst for curing the epoxide-containing resin; and
 ii. a fibrous reinforcement at least partially impregnated by the epoxy resin matrix.

25 Claims, No Drawings

FIRE-RETARDANT COMPOSITE MATERIALS

FIELD OF THE INVENTION

The present invention relates to fire-retardant fibre-reinforced composite materials and to prepregs therefor.

BACKGROUND

It is well known to use fibre-reinforced resin composite materials for the manufacture of structural components in a variety of industrial sectors. For some applications, the fibre-reinforced resin composite materials are manufactured from what are known in the art as prepregs—a prepreg comprises fibrous material pre-impregnated with a resin, and the amount of resin is matched to the amount of fibre so that after plural prepregs have been laid up into a mould and the resin has cured, optionally with a preliminary full wetting out of the fibrous material by the resin if the prepreg was initially not fully impregnated, a unitary fibre-reinforced composite material moulding is formed with the correct ratio of fibre to resin so that the material has the required material properties.

When a composite material is used for interior panel construction for mass transport applications, such as aerospace, trains, ferries, etc., in particular for the interiors of such vehicles, a fire, smoke and toxicity requirement is necessary. Historically, composite materials such as phenolic, cyanate-ester, sheet moulding compound (SMC), modified vinyl-ester and halogenated epoxides have been used for these applications. They all have significant disadvantages as shown in the table below:

TABLE 1

Known Material Comparison Table

| Family | Fire-retardancy | Smoke Density | Smoke Toxicity | Mechanical Properties | Ease of processing | Health & Safety | Cost |
|---|---|---|---|---|---|---|---|
| Sheet Moulding Compound (SMC) | Poor | Poor | Poor | Poor | Good | TBC | Low |
| Modified vinyl-ester | Poor | Poor | Poor | Poor | Poor | Poor | Low |
| Halogenated Epoxides | Good | Poor | Poor | Excellent | Excellent | Poor | Medium |
| Phenolic Resoles | Excellent | Excellent | Excellent | Poor | Poor | Poor | Low/Medium |
| Cyanate Esters | Good | Good | Excellent | Good | Good | Good | Expensive |

Prepregs employing a phenolic-based resin have been historically used for interior panels in aerospace and mass transit applications for many decades. Although such phenolic resins offer excellent fire, smoke and toxicity ("FST") properties, there is an industry desire to seek replacement resin materials for such prepregs which offer improved health and safety performance, and lower-cost processing, than phenolic resins.

Phenolic resins for use in such prepregs are cured using a condensation reaction which releases volatiles and water during curing. This requires the use of press-curing under an imposed pressure in order to impart high pressures (6 bar) to reduce the expansion of large voids within the laminate during curing of the resin. Such voids would otherwise decrease the mechanical properties of the laminate. This press-curing increases processing cost. Secondly, the release of volatiles creates poor surface finishes that require significant filling and fairing of the cured components at a substantial additional cost. The release of volatile components, and solvents, also results in the need to take specific health and safety precautions when using such phenolic resins.

Offshore oil and gas rigs have requirements to install lightweight blast protection panels. These are typically composite sandwich panels. Known phenolic prepregs are often used in these applications. However; they are limited in their application in primary structures due to their poor relative toughness and strength properties.

The use of composite materials in civil construction offers greater freedom as to the structures which can be constructed. Larger, more complex shapes which are not possible with traditional construction materials are easily formed with composite materials. Due to composites poor relative fire, smoke and toxicity properties compared to materials such as concrete and steel, the use of composites in these applications is limited. Phenolic composite panels may be used; however, they suffer from poor mechanical properties which limit their use in primary structures.

Addition-cured epoxide resins are well known in the composites industry to offer excellent mechanical properties and good health and safety properties. They are however, intrinsically flammable materials and, when used unmodified, are not suitable for applications where fire, smoke and toxicity properties are required. This has mitigated against their use in the aerospace industry, particularly for interior components Epoxides have commonly been modified with halogens (such as bromine and chlorine) in order to impart fire-retardant properties to the cured matrix. The two main disadvantages to this approach are high toxicity of smoke during combustion and poor health and safety characteristics associated with the material in both the uncured and cured state.

SUMMARY OF THE INVENTION

The present inventors have addressed these problems of known composite materials and have aimed to provide fire-retardant fibre-reinforced composite materials, and prepregs therefor, which can exhibit good fire-retardant properties in combination with good mechanical properties, and in conjunction with good processability, with regard to cost and health and safety considerations.

The present invention accordingly provides a prepreg for the manufacture of a fibre-reinforced composite material, the prepreg comprising:

i. an epoxy-resin matrix comprising:
  a. at least one non-halogenated epoxide-containing resin which has been chemically modified with at least one of a nitrogen- and/or phosphorous-containing molecule which has been chemically reacted with the epoxide-containing molecule;
  b. at least one toughening additive comprising an elastomeric or thermoplastic material chemically reacted with the at least one epoxide-containing resin;
  c. at least one mineral filler to provide fire-retardancy; and
  d. at least one catalyst for curing the epoxide-containing resin; and
ii. a fibrous reinforcement at least partially impregnated by the epoxy resin matrix.

Preferably, the at least one toughening additive comprises the combination of the elastomeric material chemically reacted with the at least one epoxide-containing resin and the thermoplastic material chemically reacted with the at least one epoxide-containing resin.

Preferably, the epoxide-containing molecule has been chemically reacted with a phosphinic acid derivative. The phosphinic acid derivative may comprise dihydro-oxa-phospha-phenanthrene-oxide (DOPO). The epoxide-containing resin may comprise from 2 to 10 wt % added phosphorous, based on the weight of the phosphorous-containing epoxide-containing resin. The epoxide-containing resin comprising phosphorous may comprise from 24 to 44 wt % of the weight of the resin matrix.

Preferably, the at least one toughening additive comprises from 3 to 30 wt %, based on the weight of the resin matrix. The at least one toughening additive may comprise, as the elastomeric material, a difunctional-terminated rubber reacted with the epoxide groups of the at least one epoxide-containing resin. The difunctional-terminated rubber may be a carboxyl-terminated rubber, for example a carboxyl-terminated butadiene acrylonitrile rubber. The difunctional-terminated rubber may comprise from 1 to 15 wt % of the weight of the resin matrix.

The at least one toughening additive may additionally or alternatively comprise a polyhydroxyl ether as the thermoplastic material. The polyhydroxyl ether may comprise from 2 to 15 wt %, of the weight of the resin matrix.

The at least one toughening additive may further comprise a rubber dispersion throughout the resin matrix. The rubber dispersion may comprise from 3 to 15 wt %, of the weight of the resin matrix.

Desirably, the at least one toughening additive comprises the combination of a difunctional-terminated rubber, as the elastomeric material, chemically reacted with the epoxide groups of the at least one epoxide-containing resin, a polyhydroxyl ether chemically reacted with the epoxide groups of the at least one epoxide-containing resin, and a rubber dispersion throughout the resin matrix.

Preferably, the at least one mineral filler comprises at least one fire-retardant mineral filler and at least one smoke-suppressant mineral filler. The at least one fire-retardant mineral filler may comprise ammonium polyphosphate. The at least one fire-retardant mineral may be present in an amount of from 15 to 30 wt % of the weight of the resin matrix. The at least one smoke-suppressant mineral filler may comprise zinc borate. The at least one smoke-suppressant mineral may be present in an amount of from 1 to 10 wt % of the weight of the resin matrix.

Preferably, the at least one catalyst comprises plural catalysts, each having a respective curing temperature range, and the plural temperature ranges overlap to provide a broader cumulative curing temperature range for the epoxide-containing resin. Typically, the at least one catalyst for curing the epoxide-containing resin comprises dicyanamide. The at least one catalyst for curing the epoxide-containing resin may further comprise a catalyst for reducing the curing temperature of the dicyanamide. The at least one catalyst for curing the epoxide-containing resin may further comprise an imidazole-based curing agent.

The prepreg may further comprise at least one anti-settling agent for the at least one mineral filler. The at least one anti-settling agent may comprise amorphous silicon dioxide. The at least one anti-settling agent may be present in an amount of from 0.1 to 1.5 wt % of the weight of the resin matrix.

The present invention also provides fibre-reinforced composite material produced from the prepreg of the present invention and to such a fibre-reinforced composite material adhered by the epoxy resin matrix to a core material, for example a honeycomb core material.

DETAILED DESCRIPTION

Embodiments of the present invention will now be described in greater detail by way of example only.

The present invention is predicated on the finding by the present inventors that an epoxide-containing resin can be modified to provide the combination of fire-retardancy and structural properties, together with good processability and cost.

In developing the fibre-reinforced composite material of the present invention, the present inventors aimed to employ an epoxide resin as the matrix resin for the composite material. In an initial development, the epoxide resin used in this invention was chemically modified with a phosphorus-containing molecule in order to impart improved fire-retardancy without the release of high levels of toxic smoke or leaching of halogens during processing/normal service life, Such an addition of a phosphorus-containing molecule in order to impart improved fire-retardancy is known in the electronics industry for use in printed circuit boards.

However, it was found by the present inventors that two significant disadvantages result from the use of such phosphorus-modified epoxides.

First, a phosphorus-modified epoxide backbone results in a reduction in cured-matrix toughness. This can result in difficulties in using these materials to bond satisfactorily to honeycomb cores for sandwich panel construction as used in interior panels incorporated into vehicle, such as aircraft and train, interiors. Secondly, the smoke release characteristics, although improved as compared to an unmodified epoxide resin, are not of a sufficient level to act as a global replacement for phenolic materials for such vehicle applications.

The epoxide resin employed in accordance with the preferred embodiments of the present invention is an addition-cured resin. Therefore no volatiles are released during cure. As compared to condensation-cured resins, such as phenolic resins, this provides the advantage of allowing components to be cured using lower-cost vacuum bag technology with significantly reduced refinishing and processing costs.

The epoxide resin employed in accordance with the preferred embodiments of the present invention is a halogen-free, modified-epoxide matrix resin and unlike phenolic systems, does not contain residual phenol or solvents. This means that it can be used in aircraft interior parts such as air-conditioning ducting without the risk of toxic phenol being leached into the passenger air supply. Its high toughness facilitates its application in aircraft flooring, previously the domain of toughened halogenated epoxides, with the additional advantage that the halogen-free, modified-epoxide matrix resin avoids the smoke toxicity issues associated with halogenated epoxides.

Fire-retardant fillers were added to the epoxide resin matrix employed in accordance with the preferred embodiments of the present invention to improve the smoke release and smoke toxicity properties of the matrix resin.

The present invention has particular application in the manufacture of multilaminar composite sandwich panels comprising a central core, for example of a honeycomb material itself known in the art, and two opposed outer plies comprising fibre-reinforced composite material incorporating a resin matrix produced in accordance with the present invention.

The resin matrix must display two main behaviours in order to achieve sufficient peel adhesion to a core such as a honeycomb core:

The matrix resin must flow sufficiently during cure in order to form sufficient contact area with the honeycomb cell surface to achieve good adhesion. Yet flow must be adequately 'controlled' to prevent excessive resin flow resulting in resin scarce areas of the prepreg laminate skins.

The matrix must exhibit toughness to withstand multiple impacts during service and resist premature matrix cracking which would result in reduce peel strength.

The present inventors found that the use of conventional toughening additives, such as a dispersed nitrile rubber in the resin matrix, did not yield sufficient adhesion to a honeycomb core (measured using a peel strength standard known in the art, EN 2243-3). It was found in particular that a combination of a thermoplastic material and an elastomeric material, such as liquid rubber, chemically reacted into the epoxide matrix, preferably in addition to the provision of a dispersed nitrile rubber, increased material peel strength to exceed the requirements for aircraft interior flooring panels.

The polyhydroxy ether may comprise a phenoxy thermoplastic material. Phenoxy thermoplastic is known to impart flow controlled properties to an epoxide matrix resin due to its ability to form multiple hydrogen-bonds with the epoxide backbone. Phenoxy thermoplastics are commonly dispersed in the epoxide resin base during manufacture. Upon cure, a phase-separation occurs resulting in a glass-state epoxide with thermoplastic domains. In this invention, the phenoxy thermoplastic was preferably reacted with available epoxide groups using a tri-phenyl phosphine catalyst.

The various components of the epoxide-resin matrix used in accordance with the preferred embodiments of the present invention are discussed in greater detail below.

Epoxide Component

The epoxide-containing resin matrix comprises as a first component an epoxide-containing resin which has been chemically modified with at least one of a nitrogen- and/or phosphorous-containing molecule which has been chemically reacted with the epoxide-containing molecule and may further comprise additional epoxide constituents.

Suitable epoxy resins include diglycidyl ethers of hi A, diglycidyl ethers of bisphenol F, epoxy novolac resins and N-glycidyl ethers, glycidyl esters, aliphatic and cycloaliphatic glycidyl ethers, glycidyl ethers of aminophenols, glycidyl ethers of any substituted phenols and blends thereof.

Preferably, the epoxide-containing resin is a non-halogenated epoxide resin where the epoxide functionality is from 1 to 10. Typically, the resin is a non-halogenated novolac-epoxide resin with an epoxide functionality of from 2 to 4.

Preferably, the nitrogen- and/or phosphorous-containing molecule is a nitrogen or phosphorus-based compound which is incorporated into the epoxide resin network through chemical reaction.

In a particularly preferred embodiment, the epoxide-containing resin is a solid (at room temperature, 20 degrees Centigrade) novolac resin reacted with a phosphinic acid derivative, such as dihydro-oxa-phospha-phenanthrene-oxide (DOPO). Such a component provides fire-retardancy via the phosphorus atom which is reacted to epoxide 'backbone'. The epoxide-containing resin may comprise from 2 to 10 wt %, typically 3 to 5 wt %, added phosphorous, based on the weight of the phosphorous-containing epoxide resin.

An epoxide resin containing DOPO is available in commerce from Schill+Seilacher, Hamburg, Germany under the trade name Struktol Polydis VP3735.

The first component may typically be present in the resin composition in an amount of from 24 to 44 wt %, more typically from 31 to 38 wt %, based on the total weight of the resin composition. If the epoxide resin containing DOPO is present in too low an amount, fire retardancy is reduced, whereas if the epoxide resin containing DOPO is present in too high an amount, toughness is reduced.

The epoxide-containing resin may further comprise an epoxide-containing diluent.

The diluent may be a tri-functional epoxide diluent, and is provided to reduce the viscosity of the resin matrix to allow hot-melt processing, prepreg flexibility (drape) and sufficient prepreg tack to allow ease of handling.

A typical diluent is Araldite DY-T available in commerce from Huntsman Advanced Materials. The diluent may typically be present in the resin composition in an amount of from 5 to 15 wt % based on the total weight of the resin composition. If the diluent is present in too low an amount, the viscosity of the resin composition may be too high, making it difficult to manufacture the prepreg, whereas if the diluent is present in too high an amount, the fire, smoke and toxicity resistance properties are reduced.

The epoxide-containing resin may further comprise a catalyst carrier which acts to assist incorporation of the latent catalyst for the epoxide resin into the composition. Typically, the catalyst carrier comprises a diglycidyl ether of bisphenol F liquid resin.

For example, the catalyst carrier may comprise a diglycidyl ether of bisphenol F liquid resin available in commerce under the trade name Epikote 862 from Resolution Performance Products.

The catalyst carrier may typically be present in the resin composition in an amount of up to 10 t %, based on the total weight of the resin composition.

Catalyst/Curing Agent Component

The epoxide-containing resin further comprises as a second component a catalyst or curing agent suitable for curing epoxide resins, optionally together with at least one additional catalyst additive or modifier. Any suitable catalyst may be used. The catalyst will be selected to correspond to the resin used. The catalyst may be accelerated. The catalyst or curing agent may typically be selected from a dicyandiamide, sulphanilamide, urone, urea, imidazole, amine, halogenated boron complex, anhydride, lewis base, phenolic novolac, or a nitrogen containing compound. Latent curing agents such as dicyandiamide, femurone and imidazole may be cured. Suitable accelerators include Diuron, Monuron, Fenuron, Chlortoluron, his-urea of toluenedlisocyanate and other substituted homologues.

Typically, the curing catalyst for the epoxide-containing resin is dicyandiamide, most preferably being in micronized form, and such a catalyst is available in commerce under the trade name Amicure CG1200E from Air Products Inc.

The curing catalyst may typically be present in the resin composition in an amount of from 1 to 15 wt %, more typically from 2 to 6 wt %, based on the total weight of the resin composition. Too low an amount of the curing catalyst may cause a reduced cure of the resin material, whereas too high an amount may cause an excessively exothermic cure.

The curing catalyst may be combined with an additional catalyst additive to reduce the activation energy, and hence the curing temperature, of the primary curing catalyst such as dicyandiamide. Such an additive may comprise urone, available in commerce under the trade name Amicure UR-S from Air Products Inc.

Such an additive may typically be present in the resin composition in an amount of up to 15 wt %, more typically from 1 to 4 wt %, based on the total weight of the resin composition. A low amount of the additional catalyst additive may cause a reduced cure speed and/or reduced curing temperature of the resin material, whereas too high an amount may cause reduced fire, smoke and toxicity resistance properties.

The curing catalyst may be yet further be combined with an additional additive imidazole-based catalyst or curing agent provided to further reduce the activation energy, and hence the curing temperature, of the urone. In addition, the C=N bonds present in imidazole have been shown to improve the fire-retardancy properties of the resultant cured epoxide-resin compared to other catalysts. Such an imidazole-based catalyst or curing agent is available in commerce under the trade name 2MZ-Azine-S from Shikoku, Japan.

The imidazole-based catalyst or curing agent may typically be present in the resin composition in an amount of up to 15 wt %, more typically from 1 to 4 wt %, based on the total weight of the resin composition. A low amount of the imidazole-based catalyst or curing agent may cause a reduced cure speed and/or reduced curing temperature of the resin material, whereas too high an amount may cause an excessively exothermic cure.

Toughening Additive(s)

The epoxide-containing resin may further comprise at least one toughening additive comprising an elastomer and/or a thermoplastic having a molecule capable of reacting with the epoxide molecule so as to be chemically bonded as a co-monomer into the epoxide resin matrix. The at least one toughening additive is provided to increase the tack of the prepreg and to enhance the toughness of the cured resin.

The elastomer preferably comprises acrylate rubbers (di- and tri-block copolymers), nitrile rubbers, polybutadiene rubbers, styrene-butadiene rubbers, silicone rubbers, polysulfide rubbers or core-shell particles (whose core is an elastomer as defined above). The elastomer is typically at least partly made with a polymer exhibiting a glass transition temperature below 0° C. The elastomer preferably contains functional groups able to react with epoxy-functionalised groups, and is preferably difunctional. Preferably the elastomer will be a functionalised acrylonitrile copolymer of low molecular weight (e.g. Hypro™, Emerald Performance Materials) or high molecular weight (e.g. Nipol® NBRs, Zeon Chemicals), or a combination thereof.

Examples of the rubbery elastomer are, for instance, a diene rubber such as polybutadiene, butadiene-acrylic acid ester copolymer or butadiene-methacrylic acid copolymer, an acrylic rubber, an ethylene-propylene rubber, a siloxane rubber, and the like. It is preferable to have functionalised end-groups such as carboxyl-terminations to enable reaction with the epoxide matrix. These may be used alone or in admixture thereof. A particularly preferred rubber toughening additive comprises a carboxyl-terminated butadiene acrylonitrile rubber.

A suitable toughening additive comprises a nitrile butadiene rubber dispersed in liquid bisphenol F epoxide resin, the dispersion containing 5 wt % nitrile butadiene rubber based on the weight of the dispersion, which is available in commerce from Schill+Seilacher. Hamburg, Germany under the trade name Struktol Polydis VP3693.

Such a nitrile butadiene rubber may typically be present in the resin composition in an amount of from 3 to 15 wt %, more typically from 7 to 10 wt %, based on the total weight of the resin composition. If the toughening additive is present in too low an amount, the resin composition may exhibit reduced tack and toughness, whereas if the toughening additive is present in too high an amount, the fire, smoke and toxicity resistance properties may be reduced.

The toughening additive may additionally or alternatively comprise a carboxyl-terminated butadiene acrylonitrile rubber.

A typical carboxyl-terminated butadiene acrylonitrile rubber is sold under the trade name CTBN 1300x13 which is available in commerce from Noveon, Ohio, USA.

The carboxyl-terminated butadiene acrylonitrile rubber may typically be present in the resin composition in an amount of from 1 to 15 wt %, more typically from 2.5 to 5 wt %, based on the total weight of the resin composition. If the carboxyl-terminated butadiene acrylonitrile rubber is present in too low an amount, the resin composition may exhibit reduced toughness and poor adhesion, for example to a core, whereas if the carboxyl-terminated butadiene acrylonitrile rubber is present in too high an amount, the fire, smoke and toxicity resistance properties may be reduced.

A further preferred toughening additive comprises a thermoplastic resin which dissolves completely into the uncured epoxide resin matrix. The thermoplastic resin used in the invention comprises a functionalised high molecular weight engineering thermoplastic, such as a polyester, a polyamide, a polyaramid, a polyarylate, a polycarbonate, a polyhydroxyether, a polyimide, a polyether imide, a polyamide imide, polyketone, polyetheretherketone, polyurethane, polyurea, polyarylether, polyarylsulfide, or polyphenylene oxide, and the like. The functional groups may be present as an end-chain or pending groups, or both, and their chemical nature may be carboxyl-, amino-, epoxy-, hydroxyl-, and the like, with a preference for functional groups most likely to react with epoxy-functionalised molecules.

Suitable thermoplastics have high strain to failure and glass transition temperatures above 150° C., preferably above 200° C. The thermoplastic may comprise a polyimide, polyether imide (PEI), polyethersulfone (PES), polysulfone, polyether ketone, polyether ether ketone (PEEK), polyamide, polyamideimide, poly(hydroxyl ether) or the like. Preferred thermoplastic resins comprise polyhydroxy-ethers (phenoxy resins).

Most preferably the thermoplastic will be a polyether ether ketone, abbreviated PEEK (ICI), a poly(hydroxyl ether), e.g. Phenoxy (InChem), a polyimide, e.g., KAPTON® (DuPont), or a polyether imide, e.g., ULTEM® (General Electric).

Such a thermoplastic, for example, a poly(hydroxyl ether), a phenoxy thermoplastic, can function to control, in particular to reduce, the flow of the resin matrix at elevated temperatures during resin curing and to increase material toughness and adhesion of the resin matrix to additional structural layers, for example a foam core of a multilaminar composite material. The phenoxy thermoplastic is typically reacted to the epoxide functional groups of the resin using a triphenyl phosphine (TPP) catalyst during manufacture of the epoxide-containing resin matrix.

The thermoplastic resin, typically phenoxy, may typically be present in the resin composition in an amount of from 2 to 15 wt %, more typically from 5 to 10 wt %, based on the total weight of the resin composition. If the phenoxy thermoplastic is present in too low an amount, the resin composition may exhibit high flow and poor adhesion, for example to a core, whereas if the phenoxy thermoplastic is present in too high an amount, the fire, smoke and toxicity resistance properties may be reduced and the viscosity may be too high.

A suitable phenoxy thermoplastic is available in commerce from InChem Corp, Rock Hill, USA, under the trade name PKHP-200.

When the carboxyl-terminated butadiene acrylonitrile rubber and phenoxy thermoplastic are present, a suitable catalyst is provided for promotion of the reaction between alcohol functional groups with epoxide functional groups and carboxylic acid functional groups with epoxide functional groups. Such a catalyst is, for example, triphenyl phosphine (TPP), which is used to react the carboxyl-terminated butadiene acrylonitrile rubber and the phenoxy thermoplastic to epoxide during resin manufacture.

Fire-Retardant/Smoke Suppressant Fillers

A further component of the epoxide-containing resin comprises fillers used to promote fire-retardancy and/or reduce generation of smoke, opacity of smoke or toxicity of smoke. Such fillers may be selected from, for example, at least one of zinc borate, melamine cyanurate, red or yellow phosphorus, aluminium trihydroxide (alumina trihydrate), and/or ammonium polyphosphate.

Optionally, such fillers are dispersed homogeneously throughout the resin matrix. However, the dispersion may alternatively be heterogeneous, for example being present in surface layers. Many improvements in properties do not require such homogeneous dispersion and so this may result in a material which is thus either over-engineered for the application or, conversely, reduced in one or more other properties Some known fire retardants are, for example, the fire retardants supplied by Albermarl Corporation under the trade mark Martinal, and under the product names OL-111/LE, OL-107/LE and OL-104/LE, and the fire retardant supplied by Borax Europe Limited under the trade mark Firebrake ZB.

The fire retardant mineral filler is typically ammonium polyphosphate, for example available under the trade name Exolit AP 422 from Clariant, Leeds, UK The fire retardant mineral filler, such as ammonium polyphosphate, may typically be present in the resin composition in an amount of from 15 to 30 wt %, more typically from 20 to 25 wt %, based on the total weight of the resin composition. If the fire retardant mineral filler is present in too high an amount, the resin composition may exhibit high viscosity, reduced toughness and poor adhesion, for example to a core, whereas if the fire retardant mineral filler is present in too low an amount, the fire, smoke and toxicity resistance properties may be reduced.

The smoke suppressant mineral filler is typically zinc borate, available in commerce under the trade name Firebrake ZB.

The smoke suppressant mineral filler, such as zinc borate, may typically be present in the resin composition in an amount of from 1 to 10 wt %, more typically from 2.5 to 5 wt %, based on the total weight of the resin composition. If the smoke suppressant mineral filler is present in too high an amount, the resin composition may exhibit high viscosity, reduced toughness and poor adhesion, for example to a core, whereas if the smoke suppressant mineral filler is present in too low an amount, the fire, smoke and toxicity resistance properties may be reduced.

The mineral fillers may optionally be provided together with a filler dispersion additive to aid wetting and dispersion of fillers during manufacture of the matrix resin. Such a filler dispersion additive is available in commerce under the trade name BYK W980 from BYK Chemie, Wesel, Germany. The filler dispersion additive may typically be present in the resin composition in an amount of up to 1 wt %, based on the total weight of the resin composition.

Further Additives

The epoxide-containing matrix resin may comprise additional additives known in the art to improve resin processing or properties, or both.

In particular, an anti-settling additive may be provided to control resin flow during resin curing, for example during curing to adhere the resin matrix to a core. In addition, such an additive can prevent settling of powder particles, such as the fire-retardant and/or smoke suppressant fillers, in the resin formulation during storage/processing. A typical anti-settling additive comprises amorphous silicon dioxide, most typically fumed hydrophobic silica, for example available under the trade name Cabot TS-720.

The anti-settling additive may typically be present in the resin composition in an amount of from 0.1 to 1.5 wt %, more typically from 0.3 to 0.5 wt %, based on the total weight of the resin composition. If the anti-settling additive is present in too low an amount, the resin composition may exhibit high flow and poor adhesion, for example to a core, whereas if the toughening additive is present in too high an amount, the rheological properties (i.e. viscosity) may be too high.

The fibrous reinforcement may comprise one or more materials such as glass fibre, aramid fibre, carbon fibre, or PAN or pitch based carbon fibre.

The modified epoxide-containing matrix resin used in the prepregs and composite materials of the present invention has particular application for use for interior panel construction for mass transport applications where a fire, smoke and toxicity requirement is necessary. The composite materials made using such a resin can provide significant advantages over the known resins discussed above, such as phenolic, cyanate-ester, SMC, modified vinyl-ester and halogenated epoxides which have been used in the past for these applications. This is shown in Table 2 below for the modified epoxide-containing matrix resin of the preferred embodiments of the present invention:

TABLE 2

Properties of Material used in Present Invention

| Fire-retardancy | Smoke Density | Smoke Toxicity | Mechanical Properties | Ease of processing | Health & Safety | Cost |
|---|---|---|---|---|---|---|
| Excellent | Excellent | Excellent | Excellent | Excellent | Excellent | Medium |

The epoxide-containing matrix resin of the preferred embodiments of the present invention has particular application in a number of applications.

The use of the epoxide-containing matrix resin of the preferred embodiments of the this invention in the field of offshore oil and gas rigs can provide lightweight blast protection panels having a lighter-weight construction with improved blast performance as compared to known phenolic panels, discussed above.

The epoxide-containing matrix resin of the preferred embodiments of the present invention may be used in structural applications where fire, smoke and toxicity performance that is similar to phenolic materials is required yet with greatly increased mechanical properties. Additional advantages include ease of processing and reduced refinishing which allow substantial cost reductions especially on large civil structures. Phenolic panels tend to be dark brown in colour and so are commonly painted to achieve the desired component colour. Problems can occur during service whereby if the material is scratched; the base colour of the phenolic becomes highly visible. The epoxide-containing matrix resin of the preferred embodiments of the present invention may be white in colour which reduces the visual impact of such scratching during use.

The epoxide-containing matrix resin of the preferred embodiments of the present invention can provide a number of technical benefits as compared to known prepregs and composite materials having fire and/or smoke resistance. In particular, there may be provided in accordance with the present invention:

- A Phenol-free alternative to phenolic prepregs.
- No volatiles are released during cure—improved mechanical properties.
- Does not require high-pressure press tooling to process, can use low-cost vacuum-bag technology.
- High-quality surface finish "straight from tooling"—does not require expensive and time-consuming refinishing.
- Pale-colour—requires less surface coating to achieve desired aesthetic and results in increased longevity during operation (i.e. scratches etc. are less visible).

The modified epoxide material produced in accordance with the present invention may be used by manufactures of composite prepregs for use in a wide-range of fire-retardant applications. The prepreg would offer a unique alternative to a wide-range of existing fire-retardant materials including (but not limited to) phenolics, halogenated epoxides, and cyanate esters but with significant advantages of the combination of enhanced fire-retardant, smoke and toxicity (FST) properties and mechanical properties, together with good resin processing.

EXAMPLES

The epoxide-containing matrix resin of the preferred embodiments of the present invention is further illustrated with reference to the following non-limiting examples.

The development of the epoxide-containing matrix resin of the present invention required the determination of three discrete parameters essential for providing a prepreg having high structural properties, represented by peel strength, high fire-retardancy, high smoke suppression and low toxicity. In addition to meeting these performance criteria, it was necessary to ensure that the epoxide-containing matrix resin was suitable for manufacture using hot-melt (non-solvent impregnation) impregnation methods. To benchmark the epoxide-containing matrix resin against current industry standards, the resin was tested to determine that it had thermal, mechanical and handling properties which adhered to the specification established by Airbus Industries, Toulouse, France for interior FST materials, in particular (AIMS 05-10-034-01).

Example 1

The fire-retardancy of a prepreg resin in accordance with the present invention was tested in the laboratory for fire-retardant properties. A cone calorimeter was used for all laboratory testing in accordance with ISO 5660-1. In addition, pilot batch material was tested to BS476 Part 6 and 7.

Various samples of epoxide resin having the following composition/additives were tested in accordance with a number of industry standard FST tests.

The Burn Time (in seconds) according to UL94 was measured, as were the time to ignition (s), the peak rate of heat release (kWm$^{-2}$), the total heat released (MJm$^{-2}$) and the smoke emission MWkg$^{-1}$). The results are shown in Table 3 below.

TABLE 3

| Parameter | FST Results UL94 Burn Time (s) | ISO 5660-1 Time to Ignition (s) | ISO 5660-1 Peak rate of heat release (kWm−2) | ISO 5660-1 Total Heat Released (MJm−2) | ISO 5660-1 Smoke Parameter (MWkg−1) |
|---|---|---|---|---|---|
| DGEBPA (bisphenol A-based prepreg matrix resin, unmodified). | >50 s | Not tested | Not tested | Not tested | Not tested |
| DGEBPF (bisphenol F-based prepreg matrix resin, unmodified) | 20-30 s | Not tested | Not tested | Not tested | Not tested |

TABLE 3-continued

| Parameter | FST Results UL94 Burn Time (s) | ISO 5660-1 Time to Ignition (s) | ISO 5660-1 Peak rate of heat release (kWm−2) | ISO 5660-1 Total Heat Released (MJm−2) | ISO 5660-1 Smoke Parameter (MWkg−1) |
|---|---|---|---|---|---|
| Phosphorus modified epoxide (DOPO) compound added to bisphenol F-based prepreg matrix resin | 0-3 s | 37 s | 177 | 25 | 234 |
| Mineral filler added to DOPO-based bisphenol F-based prepreg matrix resin | 0 s | 46 s | 170 | 24 | 107 |
| Imidazole curing agents used to substitute (in part) urone/dicyandiamide curing catalysis in DOPO-based bisphenol F-based prepreg matrix resin (Example 1) | 0 s | 51 s | 175 | 23 | 105 |

From the table it may be seen that it was found that bisphenol F epoxide resin gave improved FST performance as compared to bisphenol A epoxide resin, although neither was acceptable. In addition, the addition of the DOPO compound chemically reacted with the bisphenol F epoxide significantly improved the FST performance. An increasing concentration of DOPO-resin was found to result in improved FST properties, but at a slower cure rate and with reduced mechanical properties, particularly toughness. The further addition of mineral fillers to the DOPO-modified bisphenol F resin resulted in the smoke release and fire performance being increased. The yet further addition of an imidazole curing agent used to substitute (in part) urone/dicyandiamide curing catalysts resulted in the curing temperature and the cure time being reduced, and the FST properties being increased.

The matrix resin of Example 1 comprised:
i. 31 to 38 wt % of a non-halogenated bisphenol F epoxide resin where the epoxide functionality is from 2 to 4, the epoxide-containing resin being a solid (at room temperature, 20 degrees Centigrade) and reacted with a phosphinic acid derivative, in particular dihydro-oxa-phospha-phenanthrene-oxide (DOPO) so as to have from 3 to 5 wt % added phosphorous, based on the weight of the phosphorous-containing epoxide resin.
ii. 5 to 15 wt % of a tri-functional epoxide diluent
iii. up to 10 wt % of a catalyst carrier which comprises a diglycidyl ether of bisphenol F liquid resin.
iv. 2 to 6 wt % of dicyandiamide, in micronized form, as a primary resin curing catalyst
v. 1 to 4 wt % of urone as an additional catalyst additive to reduce primary catalyst activation energy
vi. 1 to 4 wt % of an imidazole-based catalyst additive to further reduce the primary catalyst activation energy and to improve the fire-retardancy properties
vii. 7 to 10 wt % of a nitrile butadiene rubber dispersed in liquid bisphenol F epoxide resin, the dispersion containing 5 wt % nitrile butadiene rubber based on the weight of the dispersion as a toughening additive
viii. 2.5 to 5 wt % of a carboxyl-terminated butadiene acrylonitrile rubber as a toughening additive, reacted with the epoxide resin using a triphenyl phosphine (TPP) catalyst during resin manufacture.
ix. 5 to 10 wt % of a polyhydroxy-ether resin (a phenoxy resin) as a toughening additive, reacted with the epoxide resin using a triphenyl phosphine (TPP) catalyst during resin manufacture.
x. 20 to 25 wt % of ammonium polyphosphate as a fire retardant mineral filler
xi. 2.5 to 5 wt % of zinc borate as a smoke suppressant mineral filler
xii. up to 1 wt % of a filler dispersion additive
xiii. 0.3 to 0.5 wt % of fumed hydrophobic silica as an anti-settling additive.

This resin of Example 1 was correspondingly tested and the results are also shown in Table 3.

The resin of Example 1 was additionally tested for smoke release (using standard FAR/CS 25.853) and smoke toxicity (using standard ABD 0031). The results are shown in Table 4.

TABLE 4

| ABD 0031 Toxicity (4 mins flaming) | | | | | | FAR/CS 25.853 Smoke Emission | | | | |
|---|---|---|---|---|---|---|---|---|---|---|
| HCN | CO | NO/NO2 | SO2/H2S | HF | HCl | 1 min | 1.5 min | 2 min | 3 min | 4 min |
| 1 | 47 | 11 | 0 | 0 | 1 | 8 | 13 | 17.3 | 25.3 | 33 |

Various resin compositions, including that of Example 1, were tested to determine their adhesion to a core for use in manufacturing a sandwich panel comprising a central core layer between opposite outer plies of fibre-reinforced composite material. The core used was a honeycomb core having a structure well known in the art, and in particular was composed of Nomex™. In particular, each outer ply comprised a two-ply laminate, in which the two plies of the two-ply laminate were co-cured without the use of a separate adhesive matrix resin using a heated press set at a pressure of 6 bar for one hour at 140° C.

The peel strength of the adhesive bond between the cured epoxide-containing matrix resin and the surface of the core was tested in accordance with the EN 2243-3 test standard.

A non-rubber/thermoplastic toughened epoxide matrix resin of sufficient rheology to prevent over-bleed during cure on the honeycomb core met the requirements for peel strength (EN 2243-3). However, it was found that the addition of phosphorus-modified (DOPO) epoxide caused the peel strength to be reduced, the reduction increasing with increasing DOPO concentration. It was therefore necessary to toughen the matrix resin to increase peel strength yet maintain a sufficient level of phosphorous-modified epoxide to ensure FST requirements were met.

Various toughening additives were employed. The resin of Example 1 contains, as toughening additives, a nitrile butadiene rubber dissolved in the epoxide resin, a carboxyl-terminated butadiene acrylonitrile rubber cured together with the epoxide resin so as chemically to react therewith, polyhydroxy-ether resin (a phenoxy resin) dissolved in the epoxide resin and cured together with the epoxide resin so as chemically to react therewith, and fumed silica dispersed mechanically prior to curing of the epoxide. The DOPO level was selected so as to retain the combination of high FST properties (which increase with increasing DOPO content), as discussed above, with high peel strength (which decreases with increasing DOPO content).

Example 1 was found to have a peel strength of greater than 240 N/75 mm.

Table 5 below shows the methods of toughening tested and their peel results:

TABLE 5

| Toughening Additive(s) | Manufacturing Method | Peel Strength (N/75 mm) | Comments |
|---|---|---|---|
| Acrylic Core shell rubber | Material mechanically dispersed prior to curing | Too low to be tested | |
| Fumed silica | Silica dispersed mechanically prior to curing | Too low to be tested | Fumed silica used to impart flow control. |
| Poly-Ether-Sulphone (PES) Thermoplastic | Mechanically dispersed and dissolved in matrix | | |
| Carboxyl-terminated butadiene-acrylonitrile (CTBN) | Reacted to epoxide matrix | | |
| Phenoxy Thermoplastic | Mechanically dispersed | | |
| Nitrile butadiene rubber (NBR) | Mechanically dispersed | | |
| Reduced level of DOPO (VP3735) | Mechanical Dispersion | Variable | Peel strength increases proportionally with decreasing DOPO level |

Combinations of the above toughening additives were tested in addition and are shown in Table 6 below:

TABLE 6

Combination Additives - Peel Testing (Laboratory Test)

| Formulations | "Core Shell" Rubber | Fumed Silica | PES | CTBN | Phenoxy Thermoplastic | NBR | Peel Strength Result |
|---|---|---|---|---|---|---|---|
| Formulation 1 | Dispersed | Dispersed | | | | | Too Low |
| Formulation 2 | Dispersed | Dispersed | | | | Dispersed | Too Low |
| Formulation 3 | | Dispersed | Dissolved and dispersed | | Dissolved | | 60 N/75 mm |
| Formulation 4 | | | Dissolved and dispersed | | Dissolved | | 50 N/75 mm |
| Formulation 5 | | | Dissolved and dispersed | | Dissolved | Dissolved | 40 N/75 mm |
| Formulation 6 | | Dispersed | Dissolved and dispersed | | Dissolved | Dissolved | 40 N/75 mm |
| Formulation 7 | | Dispersed | | Reacted with epoxide matrix | Dissolved and reacted with epoxide matrix | Dissolved | >240 N/75 mm |
| Formulation 8 | | Dispersed | | | Dissolved | Dissolved | 30-40 N/75 mm |
| Formulation 9 | | Dispersed | | Reacted with epoxide matrix | Dissolved | | 70 N/75 mm |
| Formulation 10 | No DOPO (VP3735) in matrix resin | Dispersed | Dissolved and dispersed | | Dissolved | Dissolved | 165 N/75 mm |

Formulation 7 comprised that of Example 1 and provided significantly enhanced peel strength. The peel strength was greater than that of formulation 10 in which the epoxide matrix contained no DOPO and so provided reduced fire smoke and toxicity (FST) properties.

Further formulations were prepared as shown in Table 7. These contained not only toughening additives as indicated but also a smoke-suppressant mineral filler zinc borate (ZB) and a fire-retardant mineral filler ammonium polyphosphate (APP).

dicarboxylic acid and epoxide/hydroxyl groups. A catalyst was used for this reaction. The phenoxy thermoplastic resin was dispersed at 110° C. afterwards but was not chemically reacted during manufacture.

It may be seen from Table 7 that Formulation 16 contained no phosphorous and so would have poor FST properties even though it contained fire- and smoke suppressant fillers, but exhibited medium peel strength of 165 N/75 mm.

Formulations 11 and 14 each contained phosphorous and also included the combination of CTBN (carboxy-termi-

TABLE 7

| Formulation | % "Reacted" Phosphorus | Fumed Silica | PES | CTBN | Phenoxy Thermoplastic | NBR | ZB | APP | Peel Strength (N/75 mm) |
|---|---|---|---|---|---|---|---|---|---|
| Formulation 11 | 1.46 | 0.5 | 0 | 6 | 7 | 0.5 | 4 | 25.5 | 233 |
| Formulation 12 | 1.68 | 0.5 | 3.5 | 0 | 3.6 | 0 | 4 | 24 | 135 |
| Formulation 13 | 1.40 | 0.5 | 0 | 9.1 | 7 | 0.5 | 4 | 25.5 | 78 |
| Formulation 14 | 1.36 | 0.5 | 0 | 4.3 | 7.1 | 0.5 | 4 | 24 | 206 |
| Formulation 15 | 1.68 | 0.5 | 3.6 | 0 | 5.0 | 0 | 4 | 23.5 | 52 |
| Formulation 16 | 0 | 0.5 | 0 | 5.1 | 8.0 | 0.48 | 4 | 23.0 | 165 |

For Formulations 11 and 14, the phenoxy thermoplastic and CTBN rubber were chemically reacted to the epoxide resin during manufacture. For the phenoxy thermoplastic, the reaction was between —OH (hydroxyl) groups and the epoxide and for the CTBN it was between the carboxylic acid groups and the epoxide/hydroxyl groups. A catalyst was used for this reaction.

For Formulation 12, the phenoxy thermoplastic was chemically reacted to the epoxide resin during manufacture. The reaction was between —OH (hydroxyl) groups and the epoxide. A catalyst was used for this reaction.

For Formulation 13, the CTBN rubber was chemically reacted to the epoxide resin. The reaction was between a dicarboxylic acid and epoxide/hydroxyl groups. A catalyst was used for this reaction. The Phenoxy resin was dispersed at 110° C. afterwards but was not chemically reacted during manufacture.

For Formulation 15, all materials were dissolved only at 110° C., no reaction of the phenoxy thermoplastic was carried out during resin manufacture.

For Formulation 16, the CTBN rubber was chemically reacted to the epoxide resin the reaction was between a nated butadiene acrylonitrile rubber) chemically reacted with the epoxide matrix resin, phenoxy thermoplastic chemically reacted with the epoxide matrix resin and NBR (nitrile butadiene rubber) mechanically dispersed in the epoxide matrix resin). These formulations exhibited high peel strength, of 233 and 206 N/75 mm respectively.

The remaining formulations in Table 7 did not contain the combination of chemically reacted CTBN, chemically reacted phenoxy thermoplastic and NBR and exhibited poorer peel strength. Comparing Formulations 13 and 16, Formulation 13 contains added DOPO and so exhibits reduced peel strength. Comparing Formulations 12 and 15, Formulation 15 does not contain CTBN and so exhibits reduced peel strength.

The peel test results in Table 7 were obtained by laboratory testing and it is expected that production material when used in real-life composite material applications would exhibit even higher peel strength.

Test standards used in this specification are detailed in Table 8 below:

TABLE 8

| Test | Revision | Type | Description |
|---|---|---|---|
| BS EN 2243-3 | 1995 | Peel Test | Peeling test metal-honeycomb core. |
| AIMS 05-10-034-01 | Issue 3, February 2005. | Airbus internal material specification | AIMS Airbus Material Specification. Fiber reinforced (woven) thermosetting preimpregnated materials for aircraft parts (e.g. cargo) subject to Fire, Smoke and Toxicity (FST) requirements - thermosetting systems - glass (S2-glass fiber, 8 shaft satin, 190 g/m$^2$) Resin mass content 40% and 50% respectively |
| ISO 5660-1 (BS476 part 15) | 1993 | Cone Calorimeter | Fire tests on building materials and structures - method for measuring the rate of heat release of products |

TABLE 8-continued

| Test | Revision | Type | Description |
| --- | --- | --- | --- |
| BS476 part 6 and 7 | 1997 | Flame spread test | Method to determine and measure flame spread of materials. |
| UL94 | Revision/Edition: 96 5TH EDITION - Internal indicative test only - i.e. test Standard not strictly adhered too. | Indicative Material Burn Test | UL 94 Tests for flammability of plastic materials for parts in devices and appliances |
| FAR/CS 25.853 | Latest issue tested Aug. 5, 2008 (external test facility) | Aerospace Smoke test | NBS Smoke Chamber in accordance with FAR/CS 25.853 Appendix F, Part V |

The invention claimed is:

1. A prepreg for the manufacture of a fibre-reinforced composite material, the prepreg comprising:
   i. an epoxy-resin matrix comprising:
   a. at least one non-halogenated epoxide-containing resin which has been chemically modified with at least one of a nitrogen- and/or phosphorous-containing molecule which has been chemically reacted with the epoxide-containing molecule;
   b. at least three toughening additives, the at least three toughening additives comprising:
      (i) a first toughening additive comprising a rubber dispersion throughout the resin matrix, the rubber dispersion comprising from 3 to 15 wt %, based on the weight of the resin matrix;
      (ii) a second toughening additive comprising an elastomeric material chemically reacted with the at least one epoxide-containing resin, wherein the elastomeric material comprises a difunctional-terminated rubber reacted with the epoxide groups of the at least one non-halogenated epoxide-containing resin, and wherein the difunctional-terminated rubber comprises from 1 to 15 wt %, based on the weight of the resin matrix; and
      (iii) a third toughening additive comprising a thermoplastic material chemically reacted with the at least one epoxide-containing resin, wherein the thermoplastic material comprises a polyhydroxyl ether reacted with the epoxide groups of the at least one epoxide-containing resin, and wherein the polyhydroxyl ether comprises from 2 to 15 wt %, based on the weight of the resin matrix;
   c. at least one mineral filler to provide fire-retardancy; and
   d. at least one catalyst for curing the epoxide-containing resin; and
   ii. a fibrous reinforcement at least partially impregnated by the epoxy resin matrix.

2. A prepreg according to claim 1 wherein the toughening additives comprise the combination of the elastomeric material chemically reacted with the at least one epoxide-containing resin and the thermoplastic material chemically reacted with the at least one epoxide-containing resin.

3. A prepreg according to claim 1 wherein the epoxide-containing molecule has been chemically reacted with a phosphinic acid derivative.

4. A prepreg according to claim 3 wherein the phosphinic acid derivative comprises dihydro-oxa-phospha-phenanthrene-oxide (DOPO).

5. A prepreg according to claim 1 wherein the epoxide-containing resin comprises from 2 to 10 wt % added phosphorous, based on the weight of the phosphorous-containing epoxide-containing resin.

6. A prepreg according to claim 1 wherein the epoxide-containing resin comprising phosphorous, comprises from 24 to 44 wt %, based on the weight of the resin matrix.

7. A prepreg according to claim 1 wherein the at least one toughening additive comprises from 3 to 15 wt %, based on the weight of the resin matrix.

8. A prepreg according to claim 1 wherein the difunctional-terminated rubber is a carboxyl-terminated butadiene acrylonitrile rubber.

9. A prepreg according to claim 1 wherein the toughening additives comprise the combination of a difunctional-terminated rubber chemically reacted with the epoxide groups of the at least one epoxide-containing resin, a polyhydroxyl ether chemically reacted with the epoxide groups of the at least one epoxide-containing resin, and a rubber dispersion throughout the resin matrix.

10. A prepreg according to claim 1 wherein the at least one mineral filler comprises at least one fire-retardant mineral filler and at least one smoke-suppressant mineral filler.

11. A prepreg according to claim 10 wherein the at least one fire-retardant mineral filler comprises ammonium polyphosphate.

12. A prepreg according to claim 10 wherein the at least one fire-retardant mineral is present in an amount of from 15 to 30 wt % based on the weight of the resin matrix.

13. A prepreg according to claim 10 wherein the at least one smoke-suppressant mineral filler comprises zinc borate.

14. A prepreg according to claim 13 wherein the at least one smoke-suppressant mineral is present in an amount of from 1 to 10 wt % based on the weight of the resin matrix.

15. A prepreg according to claim 1 wherein the at least one catalyst comprises plural catalysts, each having a respective curing temperature range, and the plural temperature ranges overlap to provide a broader cumulative curing temperature range for the epoxide-containing resin.

16. A prepreg according to claim 15 wherein the at least one catalyst for curing the epoxide-containing resin further comprises a catalyst for reducing the curing temperature of the dicyanamide.

17. A prepreg according to claim 15 wherein the at least one catalyst for curing the epoxide-containing resin further comprises an imidazole-based curing agent.

18. A prepreg according to claim 1 wherein the at least one catalyst for curing the epoxide-containing resin comprises dicyanamide.

19. A prepreg according to claim 1 further comprising at least one anti-settling agent for the at least one mineral filler.

20. A prepreg according to claim 19 wherein the at least one anti-settling agent comprises amorphous silicon dioxide.

21. A prepreg according to claim 19 wherein the at least one anti-settling agent is present in an amount of from 0.1 to 1.5 wt % based on the weight of the resin matrix.

22. A fibre-reinforced composite material produced from the prepreg of claim 1.

23. A fibre-reinforced composite material according to claim 22 adhered by the epoxy resin matrix to a core material.

24. A prepreg according to claim 1 wherein the carboxyl-terminated rubber is a carboxyl-terminated-butadiene acrylonitrile rubber.

25. A fibre-reinforced composite material according to claim 23 wherein the core material is a honeycomb core material.

\* \* \* \* \*

UNITED STATES PATENT AND TRADEMARK OFFICE
CERTIFICATE OF CORRECTION

PATENT NO. : 9,909,003 B2
APPLICATION NO. : 15/133565
DATED : March 6, 2018
INVENTOR(S) : Paul John Spencer et al.

It is certified that error appears in the above-identified patent and that said Letters Patent is hereby corrected as shown below:

In the Claims

At Column 20, Lines 18-19 (Claim 7, Lines 1-2):
Delete "the at least one toughening additive comprises"
And insert --the toughening additives comprise--

At Column 20, Line 51 (Claim 16, Line 1):
Delete "15"
And insert --18--

At Column 21, Line 6 (Claim 24, Line 1):
Delete "1"
And insert --8--

Signed and Sealed this
Fifth Day of June, 2018

Andrei Iancu
*Director of the United States Patent and Trademark Office*